United States Patent
Wu (10) Patent No.: US 11,244,686 B2
(45) Date of Patent: Feb. 8, 2022

(54) METHOD AND APPARATUS FOR PROCESSING SPEECH

(71) Applicant: Baidu Online Network Technology (Beijing) Co., Ltd., Beijing (CN)

(72) Inventor: Ya Wu, Beijing (CN)

(73) Assignees: Baidu Online Network Technology (Beijing) Co., Ltd., Beijing (CN); ShangHai Xiaodu Technology Co. Ltd., Shanghai (CN)

( * ) Notice: Subject to any disclaimer, the term of this patent is extended or adjusted under 35 U.S.C. 154(b) by 322 days.

(21) Appl. No.: 16/355,164

(22) Filed: Mar. 15, 2019

(65) Prior Publication Data
US 2020/0005793 A1    Jan. 2, 2020

(30) Foreign Application Priority Data

Jun. 29, 2018 (CN) .......................... 201810718087.4

(51) Int. Cl.
 *G10L 15/08* (2006.01)
 *G10L 15/20* (2006.01)
 *G10L 15/32* (2013.01)

(52) U.S. Cl.
 CPC .............. *G10L 15/32* (2013.01); *G10L 15/08* (2013.01); *G10L 15/20* (2013.01)

(58) Field of Classification Search
 CPC ......... G10L 15/22; G10L 17/00; G10L 17/04; G10L 17/22
 See application file for complete search history.

(56) References Cited

U.S. PATENT DOCUMENTS

| | | | |
|---|---|---|---|
| 9,892,729 B2* | 2/2018 | Yun .......................... | G10L 15/08 |
| 2012/0297284 A1* | 11/2012 | Matthews, III ......... | G10L 25/57 715/233 |
| 2013/0191124 A1* | 7/2013 | Honma .................... | G10L 15/02 704/233 |
| 2016/0210115 A1* | 7/2016 | Lee .......................... | G06F 3/167 |
| 2017/0092270 A1 | 3/2017 | Newendorp | |
| 2017/0221336 A1* | 8/2017 | Ogaz .................. | G08B 21/0423 |
| 2018/0018967 A1* | 1/2018 | Lang ........................ | G10L 15/30 |
| 2018/0033120 A1* | 2/2018 | Wang ...................... | G06T 11/60 |

(Continued)

FOREIGN PATENT DOCUMENTS

| | | |
|---|---|---|
| CN | 104145304 A | 11/2014 |
| CN | 106452987 A | 2/2017 |

(Continued)

*Primary Examiner* — Daniel C Washburn
*Assistant Examiner* — Oluwadamilola M Ogunbiyi
(74) *Attorney, Agent, or Firm* — Knobbe, Martens, Olson & Bear, LLP (57) ABSTRACT

Embodiments of a method and apparatus for processing a speech are provided. The method can include: acquiring, in response to determining at least one speech interaction device in a target speech interaction device set receiving an input speech, a speech feature of the input speech received by a speech interaction device of the at least one speech interaction device; and selecting, based on the speech feature of the input speech received by the speech interaction device in the at least one speech interaction device, a first speech interaction device from the at least one speech interaction device to process the input speech. Some embodiments realize the selection of a targeted speech interaction device.

12 Claims, 5 Drawing Sheets

(56) References Cited

U.S. PATENT DOCUMENTS

| | | | |
|---|---|---|---|
| 2018/0033438 A1* | 2/2018 | Toma | G10L 17/00 |
| 2018/0061421 A1* | 3/2018 | Sarikaya | G10L 15/1815 |
| 2018/0084022 A1* | 3/2018 | Newell | H04N 21/252 |
| 2018/0336892 A1* | 11/2018 | Kim | G10L 15/22 |
| 2019/0088261 A1* | 3/2019 | Lang | G06F 3/167 |
| 2019/0102145 A1* | 4/2019 | Wilberding | G06F 3/04817 |
| 2019/0325865 A1* | 10/2019 | Oktem | G10L 25/84 |
| 2019/0348041 A1* | 11/2019 | Celia | G06F 40/284 |
| 2020/0312317 A1* | 10/2020 | Kothari | G06F 1/3203 |
| 2020/0357410 A1* | 11/2020 | Lang | G10L 15/22 |
| 2020/0410987 A1* | 12/2020 | Tsunoo | G10L 25/51 |
| 2021/0082439 A1* | 3/2021 | Khoury | G10L 17/02 |
| 2021/0271702 A1* | 9/2021 | Irie | G06K 9/6239 |

FOREIGN PATENT DOCUMENTS

| | | |
|---|---|---|
| CN | 107016993 A | 8/2017 |
| CN | 107195305 A | 9/2017 |
| CN | 107610700 A | 1/2018 |
| CN | 107622767 A | 1/2018 |
| CN | 107680591 A | 2/2018 |
| CN | 107895578 A | 4/2018 |
| CN | 108461084 A | 8/2018 |
| JP | 2017520008 A | 7/2017 |
| JP | 2018512619 A | 5/2018 |

\* cited by examiner

METHOD AND APPARATUS FOR PROCESSING SPEECH

CROSS-REFERENCE TO RELATED APPLICATIONS

This disclosure claims priority to Chinese Patent Application no. 201810718087.4, filed with the China National Intellectual Property Administration (CNIPA) on Jun. 29, 2018, the contents of which are incorporated herein by reference in their entirety.

TECHNICAL FIELD

Embodiments of the present disclosure relate to the field of computer technology, specifically to a method and apparatus for processing a speech.

BACKGROUND

At present, with the development and popularization of smart homes, smart home devices are popularized. In a multi-space scenario, smart home devices with a speech interaction function may be placed in the bedroom, living room, kitchen, and bathroom. For example, a smart speaker may be placed in the bedroom, a smart TV may be placed in the living room, a smart refrigerator may be placed in the kitchen, and a smart washing machine may be placed in the bathroom. The existing speech processing method for the speech interaction device is generally that after a user gives a speech instruction, the speech instruction is processed by at least one speech interaction device that receives the speech instruction, thereby implementing speech interaction with the user.

SUMMARY

Embodiments of the present disclosure provide a method and apparatus for processing a speech.

In a first aspect, the embodiments of the present disclosure provide a method for processing a speech, including: acquiring, in response to determining at least one speech interaction device in a target speech interaction device set receiving an input speech, a speech feature of the input speech received by a speech interaction device of the at least one speech interaction device; and selecting, based on the speech feature of the input speech received by the speech interaction device in the at least one speech interaction device, a first speech interaction device from the at least one speech interaction device to process the input speech.

In some embodiments, the speech feature includes loudness; and the selecting, based on the speech feature of the input speech received by the speech interaction device in the at least one speech interaction device, a first speech interaction device from the at least one speech interaction device to process the input speech, includes: selecting, according to the loudness of the input speech received by the speech interaction device in the at least one speech interaction device in descending order, a preset first number of the first speech interaction devices from the at least one speech interaction device to process the input speech.

In some embodiments, the speech feature includes sound pressure; and the selecting, based on the speech feature of the input speech received by the speech interaction device in the at least one speech interaction device, a first speech interaction device from the at least one speech interaction device to process the input speech, includes: selecting, according to the sound pressure of the input speech received by the speech interaction device in the at least one speech interaction device in descending order, a preset second number of the first speech interaction devices from the at least one speech interaction device to process the input speech.

In some embodiments, the selecting, based on the speech feature of the input speech received by the speech interaction device in the at least one speech interaction device, a first speech interaction device from the at least one speech interaction device to process the input speech, includes: selecting, in response to determining that the input speech includes a preset wake-up word, based on the speech feature of the input speech received by the speech interaction device in the at least one speech interaction device, the first speech interaction device from the at least one speech interaction device for being woken up so that the woken first speech interaction device processes the input speech.

In some embodiments, before the selecting a first speech interaction device from the at least one speech interaction device to process the input speech, the method further includes: analyzing the input speech to obtain an analysis result; and the selecting a first speech interaction device from the at least one speech interaction device to process the input speech, includes: selecting the first speech interaction device from the at least one speech interaction device, and sending the analysis result to the selected first speech interaction device, so that the selected first speech interaction device performs an operation indicated by the analysis result.

In a second aspect, the embodiments of the present disclosure provide an apparatus for processing a speech, including: an acquisition unit, configured to acquire, in response to determining at least one speech interaction device in a target speech interaction device set receiving an input speech, a speech feature of the input speech received by a speech interaction device of the at least one speech interaction device; and a selection unit, configured to select, based on the speech feature of the input speech received by the speech interaction device in the at least one speech interaction device, a first speech interaction device from the at least one speech interaction device to process the input speech.

In some embodiments, the speech feature includes loudness; and the selection unit is further configured to select, based on the speech feature of the input speech received by the speech interaction device in the at least one speech interaction device, a first speech interaction device from the at least one speech interaction device to process the input speech according to the following method: selecting, according to the loudness of the input speech received by the speech interaction device in the at least one speech interaction device in descending order, a preset first number of the first speech interaction devices from the at least one speech interaction device to process the input speech.

In some embodiments, the speech feature includes sound pressure; and the selection unit is further configured to select, based on the speech feature of the input speech received by the speech interaction device in the at least one speech interaction device, a first speech interaction device from the at least one speech interaction device to process the input speech according to the following method: selecting, according to the sound pressure of the input speech received by the speech interaction device in the at least one speech interaction device in descending order, a preset second number of the first speech interaction devices from the at least one speech interaction device to process the input speech.

In some embodiments, the selection unit is further configured to select, based on the speech feature of the input speech received by the speech interaction device in the at least one speech interaction device, a first speech interaction device from the at least one speech interaction device to process the input speech according to the following method: selecting, in response to determining that the input speech includes a preset wake-up word, based on the speech feature of the input speech received by the speech interaction device in the at least one speech interaction device, the first speech interaction device from the at least one speech interaction device for being woken up so that the woken first speech interaction device processes the input speech.

In some embodiments, the apparatus further includes: an analysis unit, configured to analyze the input speech to obtain an analysis result; and the selection unit is further configured to select a first speech interaction device from the at least one speech interaction device to process the input speech according to the following method: selecting the first speech interaction device from the at least one speech interaction device, and sending the analysis result to the selected first speech interaction device, so that the selected first speech interaction device performs an operation indicated by the analysis result.

In a third aspect, the embodiments of the present disclosure provide an electronic device, including: one or more processors; and a storage apparatus, storing one or more programs thereon, and the one or more programs, when executed by the one or more processors, cause the one or more processors to implement the method as described in any one of the embodiments in the first aspect.

In a fourth aspect, the embodiments of the present disclosure provide a computer readable medium, storing a computer program thereon, the computer program, when executed by a processor, implements the method as described in any one of the embodiments in the first aspect.

The method and apparatus for processing a speech provided by the present disclosure acquire, in response to determining at least one speech interaction device in a target speech interaction device set receiving an input speech, a speech feature of the input speech received by a speech interaction device of the at least one speech interaction device, then may select, based on the speech feature of the input speech received by the speech interaction device in the at least one speech interaction device, a first speech interaction device from the at least one speech interaction device to process the input speech, thereby effectively utilizing the speech feature of the input speech received by the speech interaction device to select the first speech interaction device, and realizing the selection of a targeted speech interaction device.

BRIEF DESCRIPTION OF THE DRAWINGS

After reading detailed descriptions of non-limiting embodiments with reference to the following accompanying drawings, other features, objectives and advantages of the present disclosure will become more apparent.

DETAILED DESCRIPTION OF EMBODIMENTS

The present disclosure will be further described below in detail in combination with the accompanying drawings and the embodiments. It may be appreciated that the specific embodiments described herein are merely used for explaining the relevant disclosure, rather than limiting the disclosure. In addition, it should be noted that, for the convenience of description, only the parts related to the relevant disclosure are shown in the accompanying drawings.

It should be noted that the embodiments in the present disclosure and the features in the embodiments may be combined with each other on a non-conflict basis. The present disclosure will be described below in detail with reference to the accompanying drawings and in combination with the embodiments.

Figure 1:
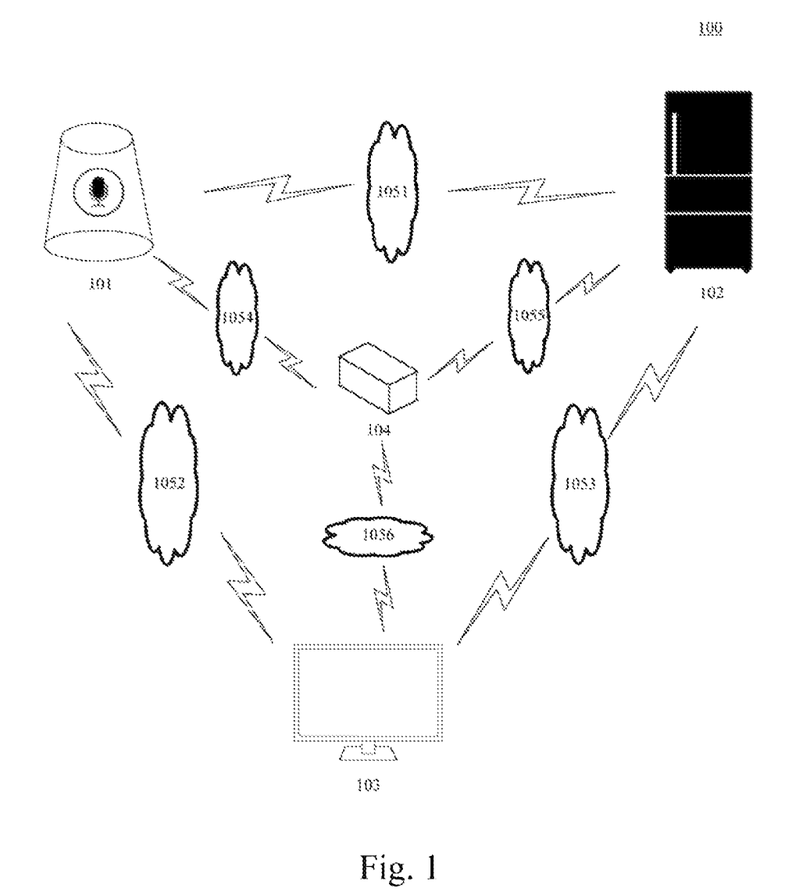
FIG. 1 is an illustrative system architecture diagram to which an embodiment of the present disclosure may be applied.

FIG. 1 illustrates an illustrative system architecture 100 to which a method for processing a speech or an apparatus for processing a speech of the present disclosure may be applied.

As shown in FIG. 1, the system architecture 100 may include speech interaction devices 101, 102, and 103, a control terminal 104, and networks 1051, 1052, 1053, 1054, 1055, and 1056. The network 1051 is configured to provide a communication link medium between the speech interaction device 101 and the speech interaction device 102. The network 1052 is configured to provide a communication link medium between the speech interaction device 101 and the speech interaction device 103. The network 1053 is configured to provide a communication link medium between the speech interaction device 102 and the speech interaction device 103. The network 1054 is configured to provide a communication link medium between the speech interaction device 101 and the control terminal 104. The network 1055 is configured to provide a communication link medium between the speech interaction device 102 and the control terminal 104. The network 1056 is configured to provide a communication link medium between the speech interaction device 103 and the control terminal 104.

The control terminal 104 may interact with the speech interaction devices 101, 102, and 103 via the networks 1054, 1055, 1056, respectively, to transmit or receive messages and the like. For example, after determining that at least one of the speech interaction devices 101, 102, and 103 receives an input speech, the control terminal 104 may acquire the speech feature of the input speech received by the speech interaction device in the at least one speech interaction device. Then, the control terminal 104 may select, based on the speech feature of the input speech received by the speech interaction device in the at least one speech interaction device, a first speech interaction device from the at least one speech interaction device to process the input speech.

The control terminal 104 may be hardware or software. When the control terminal 104 is hardware, it may be various electronic devices supporting information interaction and information processing, including but not limited to smart phones, smart watches, e-book readers, MP3 players (Moving Picture Experts Group Audio Layer III), MP4 (Moving Picture Experts Group Audio Layer IV) players, laptop portable computers and the like. When the control terminal 104 is software, it may be installed in the above-listed electronic devices. It may be implemented as a plurality of software or software modules (e.g., for providing distributed services) or as a single software or software module, which is not specifically limited in the present disclosure.

The speech interaction devices 101, 102, and 103 may be various electronic devices supporting speech interaction, including but not limited to smart speakers, smart home devices (e.g., smart TVs, smart washing machines, smart refrigerators, etc.). The speech interaction devices 101, 102, and 103 may interact with other speech interaction devices via the networks 1051, 1052, and 1053. For example, after determining that at least one of the speech interaction devices 101, 102, and 103 receives the input speech, the speech interaction device 101 may acquire the speech feature of the input speech received by the speech interaction device in the at least one speech interaction device. Then, the speech interaction device 101 may select, based on the speech feature of the input speech received by the speech interaction device in the at least one speech interaction device, a first speech interaction device from the at least one speech interaction device to process the input speech.

It should be noted that the method for processing a speech provided by the embodiments of the present disclosure may be performed by the control terminal 104. Accordingly, the apparatus for processing a speech may be disposed in the control terminal 104. The method for processing a speech may also be performed by any one of the speech interaction devices 101, 102, 103, and accordingly, the apparatus for processing a speech may be disposed in the corresponding speech interaction device.

It should also be noted that if the method for processing a speech is performed by any one of the speech interaction devices 101, 102, 103, the illustrative system architecture 100 may not have the networks 1054, 1055, 1056 and the control terminal 104.

It should be noted that the speech interaction devices 101, 102, and 103 may be hardware or software. When the speech interaction devices 101, 102, and 103 are hardware, they may be implemented as a distributed speech interaction device cluster composed of multiple speech interaction devices, or may be implemented as a single speech interaction device. When the speech interaction devices are software, they may be implemented as multiple software or software modules (e.g., for providing distributed services) or as a single software or software module, which is not specifically limited in the present disclosure.

It should be understood that the number of speech interaction devices, control terminals, and networks in FIG. 1 is merely illustrative. Depending on the implementation needs, there may be any number of speech interaction devices, control terminals and networks.

Figure 2:
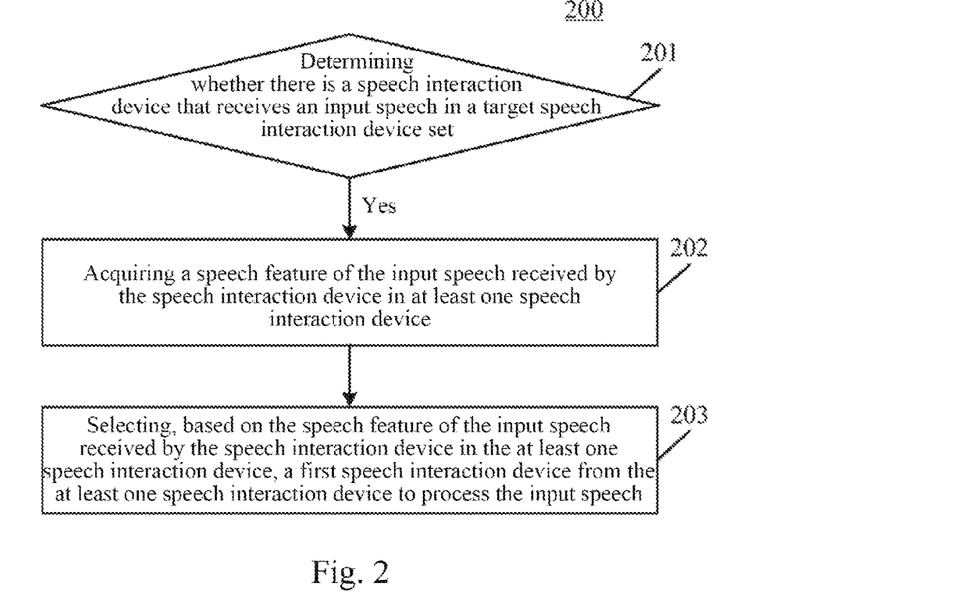
FIG. 2 is a flowchart of an embodiment of a method for processing a speech according to the present disclosure.

With further reference to FIG. 2, a flow 200 of an embodiment of a method for processing a speech according to the present disclosure is illustrated. The method for processing a speech includes the following steps:

Step 201, determining whether there is a speech interaction device that receives an input speech in a target speech interaction device set.

In some embodiments, an executor of the method for processing a speech (e.g., the control terminal 104 shown in FIG. 1, or any one of the speech interaction devices 101, 102, and 103) may determine whether there is a speech interaction device that receives the input speech in the target speech interaction device set. The speech interaction device may be a device that interacts with the user based on the input speech of the user, and can perform processing such as analyzing the input speech to feed back a speech processing result. The speech interaction device may include, but is not limited to, at least one of the following: a smart speaker, or a smart home device having a speech interaction function (for example, a smart TV, a smart refrigerator, or a smart washing machine).

In some embodiments, the target speech interaction device set may be a set of speech interaction devices that are in the same local area network (e.g., a home local area network) and may communicate with each other for information interaction. For example, the target speech interaction device set may be a set of speech interaction devices composed of a smart speaker in a bedroom, a smart TV in a living room, a smart refrigerator in a kitchen, and a smart washing machine in a bathroom in a household. The target speech interaction device set may also be a speaker combination of a smart speaker in the master bedroom, a smart speaker in the second bedroom, a smart speaker in the living room, and a smart speaker in the kitchen in a household.

In some embodiments, the executor may be a control terminal that performs speech processing on the target speech interaction device set, for example, a terminal device such as a mobile phone or a computer; and the executor may also be any speech interaction device in the target speech interaction device set. For example, if the target speech interaction device set is a set of speech interaction devices composed of a smart speaker in a bedroom, a smart TV in a living room, a smart refrigerator in a kitchen, and a smart washing machine in a bathroom, the executor may be the smart TV in the living room, or the smart speaker in the bedroom, or the smart refrigerator in the kitchen, or the smart washing machine in the bathroom.

In some embodiments, the input speech may also be referred to as input voice. If a speech interaction device in the target speech interaction device set receives the input speech, information for characterizing the reception of the input speech may be sent to the executor. The executor may also monitor the speech interaction devices in the target speech interaction device set to determine whether there is a speech interaction device that receives an input speech in the target speech interaction device set.

Step 202, acquiring, in response to determining that there is the speech interaction device that receives the input speech in the target speech interaction device set, a speech feature of the input speech received by the speech interaction device in at least one speech interaction device.

In some embodiments, if it is determined in step 201 that there is a speech interaction device that receives the input speech in the target speech interaction device set, and for the speech interaction device that receives the input speech in at least one speech interaction device, the executor may acquire the speech feature of the input speech received by the speech interaction device. The speech feature may be used to describe the speech, may include tone information, which may include the tone identification, and also the user identification of the user indicated by the tone. Since each person's voice is usually unique, each person's tone is usually unique, and the tone may be used to uniquely identify the user.

In some alternative implementations of the present embodiment, the speech feature may include, but is not limited to, at least one of the following: loudness or sound pressure. Loudness may also be called volume. The loudness depends mainly on the amplitude of the sound reception. For the same sound source, the farther the amplitude propagates, the smaller the loudness is. The sound pressure is the change that occurs when atmospheric pressure is disturbed by sound waves, that is, the residual pressure of the atmospheric pressure, which is equivalent to the pressure change caused by superimposing a sound wave disturbance on the atmospheric pressure. Here, the sound pressure may be a pressure change amount on the vibrating diaphragm in the microphone of the speech interaction device caused by the sound wave vibration of the speech interaction device when receiving the input speech.

In some embodiments, for the speech interaction device in the at least one speech interaction device, the speech interaction device may extract the speech feature from the received input speech. Then, the executor may acquire the extracted speech feature from the speech interaction device. The executor may also acquire the received input speech from the speech interaction device, and then extract the speech feature from the acquired input speech as the speech feature of the input speech received by the speech interaction device.

It should be noted that the executor may generally acquire the speech feature for each of the at least one speech interaction device that receives the input speech.

Step 203, selecting, based on the speech feature of the input speech received by the speech interaction device in the at least one speech interaction device, a first speech interaction device from the at least one speech interaction device to process the input speech.

In some embodiments, the executor may select, based on the speech feature of the input speech received by the speech interaction device in the at least one speech interaction device, a first speech interaction device from the at least one speech interaction device to process the input speech.

In some embodiments, a corresponding relationship table of corresponding relationships between tone information and speech interaction device identifiers may be stored in the executor. If the acquired speech feature is tone information, the executor may use the above corresponding relationship table to select the speech interaction device indicated by a speech interaction device identifier corresponding to the acquired tone information from the at least one speech interaction device, so that the selected first speech interaction device processes the input speech.

In some embodiments, the selected first speech interaction device may perform speech recognition and semantic understanding on the input speech to obtain an analysis result. In the speech recognition process, the selected first speech interaction device may perform steps such as feature extraction, speech decoding, and text conversion on the input speech. In the semantic understanding process, the selected first speech interaction device may perform natural language understanding (NLU), keyword extraction, and user intention analysis using artificial intelligence (AI) algorithm on text information obtained by the speech recognition. The user intention may refer to one or more purposes that the user wants to achieve.

In some embodiments, if the analysis result includes a user instruction, the selected first speech interaction device may perform an operation indicated by the user instruction. Generally speaking, the user instruction may include at least one of operation information of an operation to be performed or object information of an object on which the operation is to be performed. The operation to be performed may include, but is not limited to: playing music, answering questions, and timing. If the operation to be performed is playing music, the object on which the operation is to be performed may be a music name.

It should be noted that the speech feature extraction, speech decoding technology, text conversion, keyword extraction, and artificial intelligence algorithm are well-known technologies widely studied and applied at present, and detailed descriptions thereof will be omitted.

In some embodiments, the executor may send a speech processing instruction to the selected first speech interaction device after the speech interaction device is selected, and the speech interaction device that receives the speech processing instruction may process the input speech.

In some alternative implementations of the present embodiment, if the acquired speech feature includes sound pressure, the executor may select, according to the sound pressure generated on the vibrating diaphragm in the microphone of the speech interaction device by the input speech received by the speech interaction device in the at least one speech interaction device in descending order, a preset second number (for example, one or three) of the first speech interaction devices from the at least one speech interaction device to process the input speech. For example, if the speech interaction device that receives the input speech includes a smart speaker in a bedroom, a smart TV in a living room, and a smart refrigerator in a kitchen, the sound pressure of the input speech received by the smart speaker in the bedroom acquired by the executor is 0.002 Pascal (Pa), the sound pressure of the input speech received by the smart TV in the living room acquired by the executor is 0.02 Pascal, and the sound pressure of the input speech received by the smart refrigerator in the kitchen acquired by the executor is 0.0012 Pascal. The executor may select the smart TV in the living room that receives the input speech with the highest sound pressure to process the input speech.

In some alternative implementations of the present embodiment, the executor may analyze the input speech to obtain an analysis result. The executor may perform speech recognition and semantic understanding on the input speech to obtain an analysis result. In the speech recognition process, the executor may perform steps such as feature extraction, speech decoding, and text conversion on the input speech. In the semantic understanding process, the executor may perform natural language understanding, keyword extraction, and user intention analysis using artificial intelligence algorithm on text information obtained by the speech recognition. The user intention may refer to one or more purposes that the user wants to achieve. Then, the executor may select a first speech interaction device from the at least one speech interaction device, and send the analysis result to the selected first speech interaction device, so that the selected first speech interaction device performs an operation indicated by the analysis result. If the above analysis result includes a user instruction, the selected first speech interaction device may perform the operation indicated by the user instruction. Generally speaking, the user instruction may include at least one of operation information of an operation to be performed or object information of an object on which the operation is to be performed. The operation to be performed may include, but is not limited to: playing music, answering questions, and timing. If the operation to be performed is playing music, the object on which the operation is to be performed may be a music name.

Figure 3:
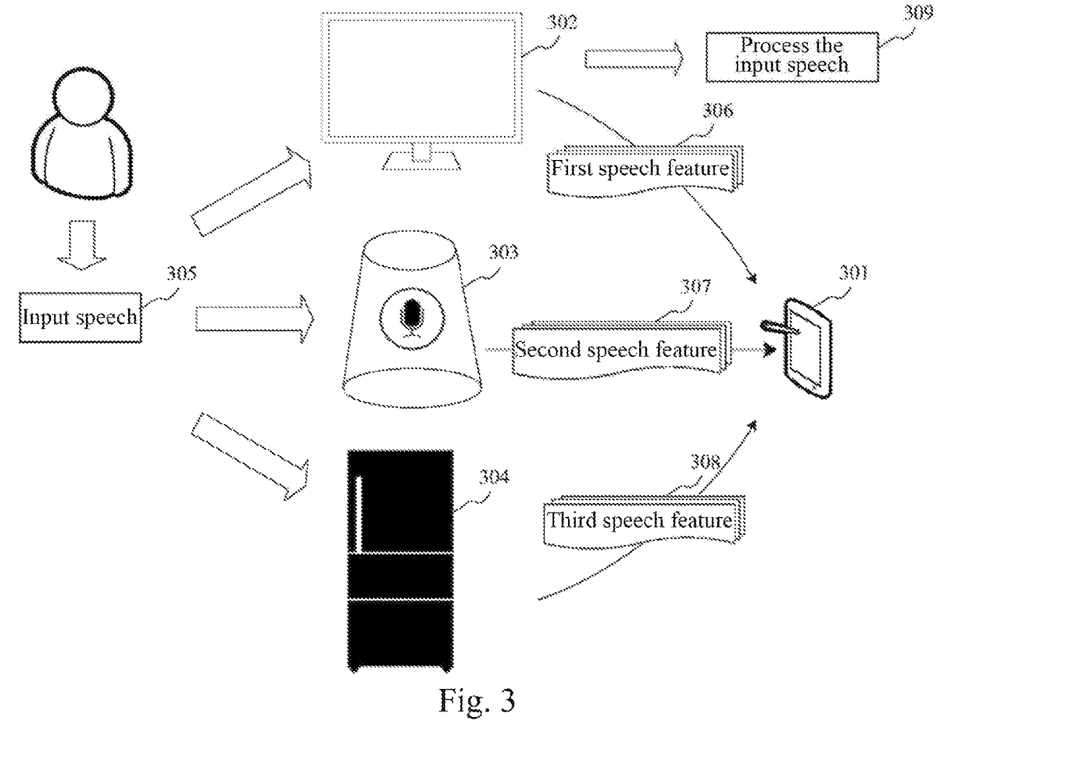
FIG. 3 is a schematic diagram of an application scenario of the method for processing a speech according to an embodiment of the present disclosure.

With further reference to FIG. 3, a schematic diagram of an application scenario of the method for processing a speech according to the present embodiment is illustrated. In the application scenario of FIG. 3, a target speech interaction device set comprises a smart TV 302 in the living room, a smart speaker 303 in the bedroom, and a smart refrigerator 304 in the kitchen. The user speaks the input speech 305 of "playing the song Welcome to Beijing" in the living room. If the smart TV 302, the smart speaker 303, and the smart refrigerator 304 all receive the input speech 305, the smart TV 302, the smart speaker 303, and the smart refrigerator 304 may send information for characterizing the reception of the input speech to the executor 301 of the method for processing a speech. Then, the executor 301 may respectively acquire a first speech feature 306, a second speech feature 307, and a third speech feature 308 of the input speech received by the smart TV 302, the smart speaker 303, and the smart refrigerator 304 respectively. For example, the first speech feature 306, the second speech feature 307, and the third speech feature 308 may all be tone identifiers 2. Then, the executor 301 may store the corresponding relationship table of corresponding relationships between the tone identifier and the speech interaction device identifier, and the executor 301 may find in the corresponding relationship table that the speech interaction device identifier corresponding to the tone identifier 2 is the smart TV. The executor 301 may select the smart TV 302 to process the input speech 305 "playing the song Welcome to Beijing" (as indicated by reference numeral 309), and the smart TV 302 plays the song "Welcome to Beijing."

The method provided by the above embodiments of the present disclosure selects a speech interaction device based on the speech feature of the input speech received by the speech interaction device, realizing the selection of a targeted speech interaction device.

Figure 4:
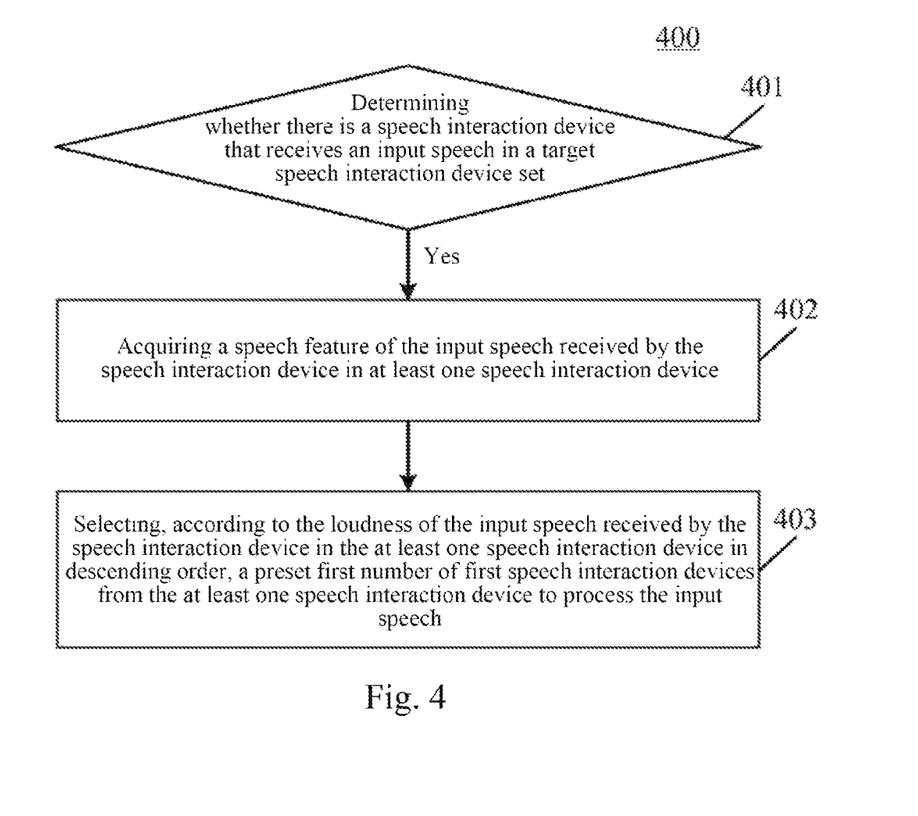
FIG. 4 is a flowchart of another embodiment of the method for processing a speech according to the present disclosure.

With further reference to FIG. 4, a flow 400 of another embodiment of the method for processing a speech is illustrated. The flow 400 of the method for processing a speech includes the following steps:

Step 401, determining whether there is a speech interaction device that receives an input speech in a target speech interaction device set.

Step 402, acquiring, in response to determining that there is a speech interaction device that receives the input speech in the target speech interaction device set, a speech feature of the input speech received by the speech interaction device in at least one speech interaction device.

In some embodiments, the operations of steps 401-402 are substantially the same as the operations of steps 201-202, and detailed descriptions thereof will be omitted.

Step 403, selecting, according to the loudness of the input speech received by the speech interaction device in the at least one speech interaction device in descending order, a preset first number of first speech interaction devices from the at least one speech interaction device to process the input speech.

In some embodiments, the acquired speech feature may include loudness, and the loudness may also be referred to as volume. The loudness depends mainly on the amplitude of the sound reception. For the same sound source, the farther the amplitude propagates, the smaller the loudness is. The executor may select, according to the loudness of the input speech received by the speech interaction device in the at least one speech interaction device in descending order, a preset first number (for example, one or two) of first speech interaction devices from the at least one speech interaction device to process the input speech.

For example, if the speech interaction device that receives the input speech includes a smart speaker in the bedroom, a smart TV in the living room, and a smart refrigerator in the kitchen, the executor acquires the loudness of the input speech received by the smart speaker in the bedroom 6, the loudness of the input speech received by the smart TV in the living room 8, and the loudness of the input speech received by the smart refrigerator in the kitchen 2. The executor may select the smart TV in the living room that receives the loudest input speech to process the input speech.

As can be seen in FIG. 4, the flow 400 of the method for processing a speech in some embodiments has an additional step of selecting, according to the loudness of the input speech received by the speech interaction devices in descending order, a first speech interaction device from the at least one speech interaction device to process the input speech, when compared to the embodiment corresponding to FIG. 2. Therefore, the solution described in some embodiments may select a speech interaction device that is closer to the sound source to process the input speech, thereby improving the accuracy of the speech processing.

Figure 5:
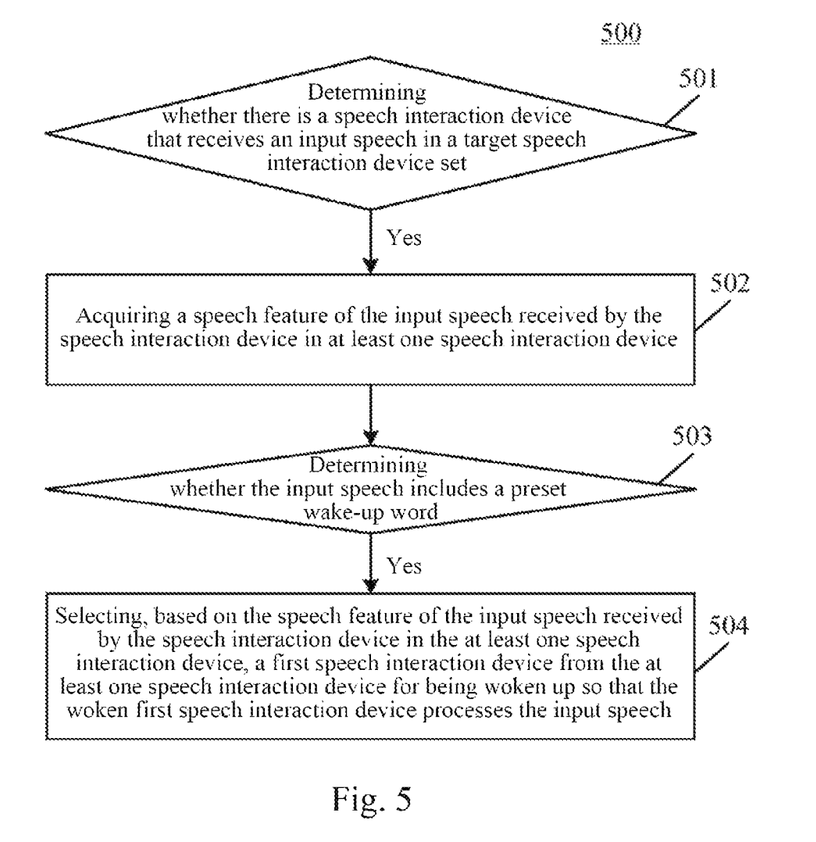
FIG. 5 is a flowchart of still another embodiment of the method for processing a speech according to the present disclosure.

With further reference to FIG. 5, a flow 500 of yet another embodiment of the method for processing a speech is illustrated. The flow 500 of the method for processing a speech includes the following steps:

Step 501, determining whether there is a speech interaction device that receives an input speech in a target speech interaction device set.

Step 502, acquiring, in response to determining that there is the speech interaction device that receives the input speech in the target speech interaction device set, a speech feature of the input speech received by the speech interaction device in at least one speech interaction device.

In some embodiments, the operations of steps 501-502 are substantially the same as the operations of steps 201-202, and detailed descriptions thereof will be omitted.

Step 503, determining whether the input speech includes a preset wake-up word.

In some embodiments, the executor may determine whether the input speech includes a preset wake-up word. Specifically, the executor may decode the input speech to obtain a phoneme sequence, and then compare the phoneme sequence with a pre-stored phoneme sequence of the wake-up word. If there is a phoneme sequence in the decoded phoneme sequence that matches the stored phoneme sequence of the wake-up word, it is determined that the speech input information includes the preset wake-up word. The wake-up word may be a preset command word, for example, open, hello, or hi. It should be noted that the wake-up word may be default or may be set by the user.

Step 504, selecting, in response to determining that the input speech includes a preset wake-up word, based on the speech feature of the input speech received by the speech interaction device in the at least one speech interaction device, a first speech interaction device from the at least one speech interaction device for being woken up so that the woken first speech interaction device processes the input speech.

In some embodiments, if it is determined in step 503 that the input speech includes a preset wake-up word, the executor may select, based on the speech feature of the input speech received by the speech interaction device in the at least one speech interaction device, the first speech interaction device from the at least one speech interaction device for being woken up so that the woken first speech interaction device processes the input speech. The woken first speech interaction device may perform processing such as speech recognition and semantic understanding on the input speech to recognize the user's intention and the operation indicated by the user's intention. For example, if the user intends to play the song "Welcome to Beijing," the selected first speech interaction device may play the song "Welcome to Beijing."

As can be seen in FIG. 5, the flow 500 of the method for processing a speech in some embodiments has an additional step of if the input speech includes a preset wake-up word, waking up the selected first speech interaction device so that the woken speech interaction device processes the input speech, when compared to the embodiment corresponding to FIG. 2. Therefore, the solution described in some embodiments may process the received input speech using the woken first speech interaction device without re-selecting a speech interaction device for speech processing each time, which may make the speech processing process more convenient and improve the efficiency of speech processing.

Figure 6:
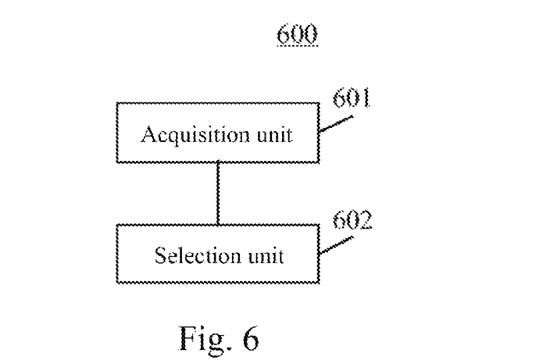
FIG. 6 is a schematic structural diagram of an embodiment of an apparatus for processing a speech according to the present disclosure.

With further reference to FIG. 6, as an implementation of the method shown in the above figures, the present disclosure provides an embodiment of an apparatus for processing a speech, and the apparatus embodiment corresponds to the method embodiment as shown in FIG. 2, and the apparatus may be specifically applied to various electronic devices.

As shown in FIG. 6, the apparatus 600 for processing a speech of the present embodiment includes: an acquisition unit 601 and a selection unit 602. The acquisition unit 601 is configured to acquire, in response to determining at least one speech interaction device in a target speech interaction device set receiving an input speech, a speech feature of the input speech received by a speech interaction device of the at least one speech interaction device. The selection unit 602 is configured to select, based on the speech feature of the input speech received by the speech interaction device in the at least one speech interaction device, a first speech interaction device from the at least one speech interaction device to process the input speech.

In some embodiments, the specific processing of the acquisition unit 601 of the apparatus 600 for processing a speech may refer to step 201 and step 202 in the corresponding embodiment of FIG. 2, and the specific processing of the selection unit 602 may refer to step 203 in the corresponding embodiment of FIG. 2.

In some alternative implementations of the present embodiment, the speech feature may include loudness. The loudness may also be referred to as volume. The loudness depends mainly on the amplitude of the sound reception. For the same sound source, the farther the amplitude propagates, the smaller the loudness is. The selection unit 602 may select, according to the loudness of the input speech received by the speech interaction device in the at least one speech interaction device in descending order, a preset first number of the first speech interaction devices from the at least one speech interaction device to process the input speech.

In some alternative implementations of the present embodiment, the speech feature may include sound pressure. The sound pressure is the change caused by the atmospheric pressure being disturbed by the sound wave, that is, the residual pressure of the atmospheric pressure, which is equivalent to the pressure change caused by superimposing a sound wave disturbance on the atmospheric pressure. Here, the sound pressure may be a pressure change amount on the vibrating diaphragm in the microphone of the speech interaction device caused by the sound wave vibration of the speech interaction device when receiving the input speech. If the acquired speech feature includes sound pressure, the selection unit 602 may select, according to the sound pressure generated on the vibrating diaphragm in the microphone of the speech interaction device by the input speech received by the speech interaction device in the at least one speech interaction device in descending order, a preset second number of the first speech interaction devices from the at least one speech interaction device to process the input speech.

In some alternative implementations of the present embodiment, the selection unit 602 may determine whether the input speech includes a preset wake-up word. Specifically, the selection unit 602 may decode the input speech to obtain a phoneme sequence, and then compare the phoneme sequence with a pre-stored phoneme sequence of the wake-up word. If there is a phoneme sequence in the decoded phoneme sequence that matches the stored phoneme sequence of the wake-up word, it is determined that the speech input information includes the preset wake-up word. The wake-up word may be a preset command word, for example, open, hello, or hi. If it is determined that the input speech includes the preset wake-up word, the selection unit 602 may select, based on the speech feature of the input speech received by the speech interaction device in the at least one speech interaction device, the first speech interaction device from the at least one speech interaction device for being woken up so that the woken first speech interaction device processes the input speech. The woken first speech interaction device may perform processing such as speech recognition and semantic understanding on the input speech to recognize the user's intention and the operation indicated by the user's intention.

In some alternative implementations of the present embodiment, the apparatus 600 for processing a speech may further include an analysis unit (not shown in the figure). The analysis unit may be configured to analyze the input speech to obtain an analysis result. The analysis unit may perform speech recognition and semantic understanding on the input speech to obtain an analysis result. In the speech recognition process, the analysis unit may perform steps such as feature extraction, speech decoding, and text conversion on the input speech. In the semantic understanding process, the analysis unit may perform natural language understanding, keyword extraction, and user intention analysis using artificial intelligence algorithm on the text information obtained by the speech recognition. The user intention may refer to one or more purposes that the user wants to achieve. Then, the selection unit 602 may select a first speech interaction device from the at least one speech interaction device, and send the analysis result to the selected first speech interaction device, so that the selected first speech interaction device performs an operation indicated by the analysis result. If the above analysis result includes a user instruction, the selected first speech interaction device may perform the operation indicated by the user instruction. Generally speaking, the user instruction may include at least one of operation information of an operation to be performed or object information of an object on which the operation is to be performed. The operation to be performed may include, but is not limited to: playing music, answering questions, and timing. If the operation to be performed is playing music, the object on which the operation is to be performed may be a music name.

Figure 7:
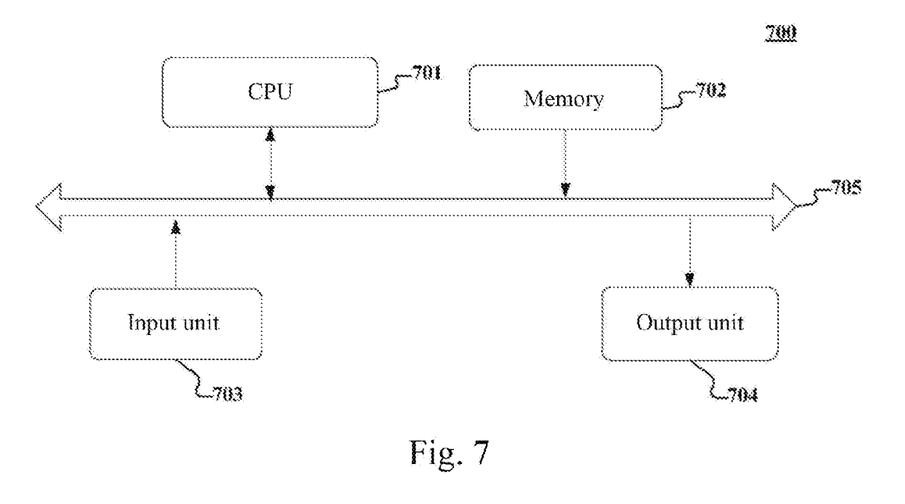
FIG. 7 is a schematic structural diagram of a computer system adapted to implement an electronic device of the embodiments of the present disclosure.

With further reference to FIG. 7, a schematic structural diagram of a computer system 700 adapted to implement an electronic device (for example, the control terminal 104 shown in FIG. 1) of the embodiments of the present disclosure is shown. The electronic device shown in FIG. 7 is merely an example, and should not limit the function and scope of use of the embodiments of the present disclosure.

As shown in FIG. 7, the computer system 700 includes a central processing unit (CPU) 701, a memory 702, an input unit 703, and an output unit 704. Here, the CPU 701, the memory 702, the input unit 703, and the output unit 704 are connected to each other through a bus 705. Here, the method according to the embodiments of the present disclosure may be implemented as a computer program and stored in the memory 702. The CPU 701 in the computer system 700 specifically implements the speech processing function defined in the method of the embodiments of the present disclosure by calling the above computer program stored in the memory 702.

In particular, according to the embodiments of the present disclosure, the process described above with reference to the flow chart may be implemented in a computer software program. For example, an embodiment of the present disclosure includes a computer program product, which includes a computer program that is tangibly embedded in a computer-readable medium. The computer program includes program codes for performing the method as illustrated in the flow chart. The computer program, when executed by the central processing unit (CPU) 701, implements the above mentioned functionalities as defined by the method of some embodiments of the present disclosure. It should be noted that the computer readable medium in some embodiments of the present disclosure may be computer readable signal medium or computer readable storage medium or any combination of the above two. An example of the computer readable storage medium may include, but not limited to: electric, magnetic, optical, electromagnetic, infrared, or semiconductor systems, apparatus, elements, or a combination of any of the above. A more specific example of the computer readable storage medium may include but is not limited to: electrical connection with one or more wire, a portable computer disk, a hard disk, a random access memory (RAM), a read only memory (ROM), an erasable programmable read only memory (EPROM or flash memory), a fiber, a portable compact disk read only memory (CD-ROM), an optical memory, a magnet memory or any suitable combination of the above. In some embodiments of the present disclosure, the computer readable storage medium may be any physical medium containing or storing programs which may be used by a command execution system, apparatus or element or incorporated thereto. In some embodiments of the present disclosure, the computer readable signal medium may include data signal in the base band or propagating as parts of a carrier, in which computer readable program codes are carried. The propagating data signal may take various forms, including but not limited to: an electromagnetic signal, an optical signal or any suitable combination of the above. The signal medium that can be read by computer may be any computer readable medium except for the computer readable storage medium. The computer readable medium is capable of transmitting, propagating or transferring programs for use by, or used in combination with, a command execution system, apparatus or element. The program codes contained on the computer readable medium may be transmitted with any suitable medium including but not limited to: wireless, wired, optical cable, RF medium etc., or any suitable combination of the above.

The flow charts and block diagrams in the accompanying drawings illustrate architectures, functions and operations that may be implemented according to the systems, methods and computer program products of the various embodiments of the present disclosure. In this regard, each of the blocks in the flow charts or block diagrams may represent a module, a program segment, or a code portion, said module, program segment, or code portion including one or more executable instructions for implementing specified logic functions. It should also be noted that, in some alternative implementations, the functions denoted by the blocks may occur in a sequence different from the sequences shown in the accompanying drawings. For example, any two blocks presented in succession may be executed, substantially in parallel, or they may sometimes be in a reverse sequence, depending on the function involved. It should also be noted that each block in the block diagrams and/or flow charts as well as a combination of blocks may be implemented using a dedicated hardware-based system performing specified functions or operations, or by a combination of a dedicated hardware and computer instructions.

The units involved in the embodiments of the present disclosure may be implemented by means of software or hardware. The described units may also be provided in a processor, for example, described as: a processor, including an acquisition unit and a selection unit. Here, the names of these units do not in some cases constitute a limitation to such units themselves. For example, the selection unit may also be described as "a unit for selecting, based on the speech feature of the input speech received by the speech interaction device in the at least one speech interaction device, a first speech interaction device from the at least one speech interaction device to process the input speech."

In another aspect, the present disclosure further provides a computer readable medium. The computer readable medium may be included in the apparatus in the above described embodiments, or a stand-alone computer readable medium not assembled into the apparatus. The computer readable medium stores one or more programs. The one or more programs, when executed by the apparatus, cause the apparatus to: acquire, in response to determining at least one speech interaction device in a target speech interaction device set receiving an input speech, a speech feature of the input speech received by a speech interaction device of the at least one speech interaction device; and select, based on the speech feature of the input speech received by the speech interaction device in the at least one speech interaction device, a first speech interaction device from the at least one speech interaction device to process the input speech.

The above description only provides an explanation of the preferred embodiments of the present disclosure and the technical principles used. It should be appreciated by those skilled in the art that the inventive scope of the present disclosure is not limited to the technical solutions formed by the particular combinations of the above-described technical features. The inventive scope should also cover other technical solutions formed by any combinations of the above-described technical features or equivalent features thereof without departing from the concept of the present disclosure. Technical schemes formed by the above-described features being interchanged with, but not limited to, technical features with similar functions disclosed in the present disclosure are examples.

What is claimed is:
1. A method for processing speech, the method comprising:
acquiring, in response to determining at least one speech interaction device in a target speech interaction device set receiving an input speech, a speech feature of the input speech received by a speech interaction device of the at least one speech interaction device; and selecting, based on the speech feature of the input speech received by the speech interaction device in the at least one speech interaction device, a first speech interaction device from the at least one speech interaction device to process the input speech, wherein the speech feature comprises sound pressure;

wherein selecting, based on the speech feature of the input speech received by the speech interaction device in the at least one speech interaction device, the first speech interaction device from the at least one speech interaction device to process the input speech, comprises:

selecting, according to the sound pressure of the input speech received by the speech interaction device in the at least one speech interaction device in descending order, a preset first number of the at least one speech interaction device from the at least one speech interaction device to process the input speech; and wherein the method is performed by at least one hardware processor.

2. The method according to claim 1, wherein the speech feature further comprises loudness; and the selecting, based on the speech feature of the input speech received by the speech interaction device in the at least one speech interaction device, a first speech interaction device from the at least one speech interaction device to process the input speech, further comprises:

selecting, according to the loudness of the input speech received by the speech interaction device in the at least one speech interaction device in descending order, a preset second number of the at least one speech interaction device from the at least one speech interaction device to process the input speech.

3. The method according to claim 1, wherein the selecting, based on the speech feature of the input speech received by the speech interaction device in the at least one speech interaction device, a first speech interaction device from the at least one speech interaction device to process the input speech, comprises:

selecting, in response to determining that the input speech comprises a preset wake-up word, based on the speech feature of the input speech received by the speech interaction device in the at least one speech interaction device, the first speech interaction device from the at least one speech interaction device for being woken up so that the woken first speech interaction device processes the input speech.

4. The method according to claim 1, wherein before the selecting a first speech interaction device from the at least one speech interaction device to process the input speech, the method further comprises:

analyzing the input speech to obtain an analysis result; and the selecting a first speech interaction device from the at least one speech interaction device to process the input speech, comprises:

selecting the first speech interaction device from the at least one speech interaction device, and sending the analysis result to the selected first speech interaction device, so that the selected first speech interaction device performs an operation indicated by the analysis result.

5. An apparatus for processing speech, the apparatus comprising:

at least one processor; and a memory storing instructions, the instructions when executed by the at least one processor, cause the at least one processor to perform operations, the operations comprising:

acquiring, in response to determining at least one speech interaction device in a target speech interaction device set receiving an input speech, a speech feature of the input speech received by a speech interaction device of the at least one speech interaction device; and selecting, based on the speech feature of the input speech received by the speech interaction device in the at least one speech interaction device, a first speech interaction device from the at least one speech interaction device to process the input speech;

wherein the speech feature comprises sound pressure; and wherein selecting, based on the speech feature of the input speech received by the speech interaction device in the at least one speech interaction device, the first speech interaction device from the at least one speech interaction device to process the input speech, comprises:

selecting, according to the sound pressure of the input speech received by the speech interaction device in the at least one speech interaction device in descending order, a preset first number of the at least one speech interaction device from the at least one speech interaction device to process the input speech.

6. The apparatus according to claim 5, wherein the speech feature further comprises loudness; and the selecting, based on the speech feature of the input speech received by the speech interaction device in the at least one speech interaction device, a first speech interaction device from the at least one speech interaction device to process the input speech, further comprises:

selecting, according to the loudness of the input speech received by the speech interaction device in the at least one speech interaction device in descending order, a preset second number of the at least one speech interaction device from the at least one speech interaction device to process the input speech.

7. The apparatus according to claim 5, wherein the selecting, based on the speech feature of the input speech received by the speech interaction device in the at least one speech interaction device, a first speech interaction device from the at least one speech interaction device to process the input speech, comprises:

selecting, in response to determining that the input speech comprises a preset wake-up word, based on the speech feature of the input speech received by the speech interaction device in the at least one speech interaction device, the first speech interaction device from the at least one speech interaction device for being woken up so that the woken first speech interaction device processes the input speech.

8. The apparatus according to claim 5, wherein before the selecting a first speech interaction device from the at least one speech interaction device to process the input speech, the operations further comprise:

analyzing the input speech to obtain an analysis result; and the selecting a first speech interaction device from the at least one speech interaction device to process the input speech, comprises:

selecting the first speech interaction device from the at least one speech interaction device, and sending the analysis result to the selected first speech interaction device, so that the selected first speech interaction device performs an operation indicated by the analysis result.

9. A non-transitory computer-readable storage medium storing a computer program, the computer program, when executed by one or more processors, causes the one or more processors to perform operations, the operations comprising:
  acquiring, in response to determining at least one speech interaction device in a target speech interaction device set receiving an input speech, a speech feature of the input speech received by a speech interaction device of the at least one speech interaction device; and
  selecting, based on the speech feature of the input speech received by the speech interaction device in the at least one speech interaction device, a first speech interaction device from the at least one speech interaction device to process the input speech;
  wherein the speech feature comprises sound pressure; and
  wherein selecting, based on the speech feature of the input speech received by the speech interaction device in the at least one speech interaction device, the first speech interaction device from the at least one speech interaction device to process the input speech, comprises:
    selecting, according to the sound pressure of the input speech received by the speech interaction device in the at least one speech interaction device in descending order, a preset first number of the at least one speech interaction device from the at least one speech interaction device to process the input speech.

10. The non-transitory computer-readable storage medium according to claim 9, wherein the speech feature further comprises loudness; and
  wherein selecting, based on the speech feature of the input speech received by the speech interaction device in the at least one speech interaction device, the first speech interaction device from the at least one speech interaction device to process the input speech, further comprises:
    selecting, according to the loudness of the input speech received by the speech interaction device in the at least one speech interaction device in descending order, a preset second number of the at least one speech interaction device from the at least one speech interaction device to process the input speech.

11. The non-transitory computer-readable storage medium according to claim 9, wherein selecting, based on the speech feature of the input speech received by the speech interaction device in the at least one speech interaction device, the first speech interaction device from the at least one speech interaction device to process the input speech, comprises:
  selecting, in response to determining that the input speech comprises a preset wake-up word, based on the speech feature of the input speech received by the speech interaction device in the at least one speech interaction device, the first speech interaction device from the at least one speech interaction device for being woken up so that the woken first speech interaction device processes the input speech.

12. The non-transitory computer-readable storage medium according to claim 9, wherein before selecting the first speech interaction device from the at least one speech interaction device to process the input speech, the method further comprises:
  analyzing the input speech to obtain an analysis result; and
  wherein selecting the first speech interaction device from the at least one speech interaction device to process the input speech, comprises:
    selecting the first speech interaction device from the at least one speech interaction device, and sending the analysis result to the selected first speech interaction device such that the selected first speech interaction device performs an operation indicated by the analysis result.

* * * * *